Patented July 12, 1932

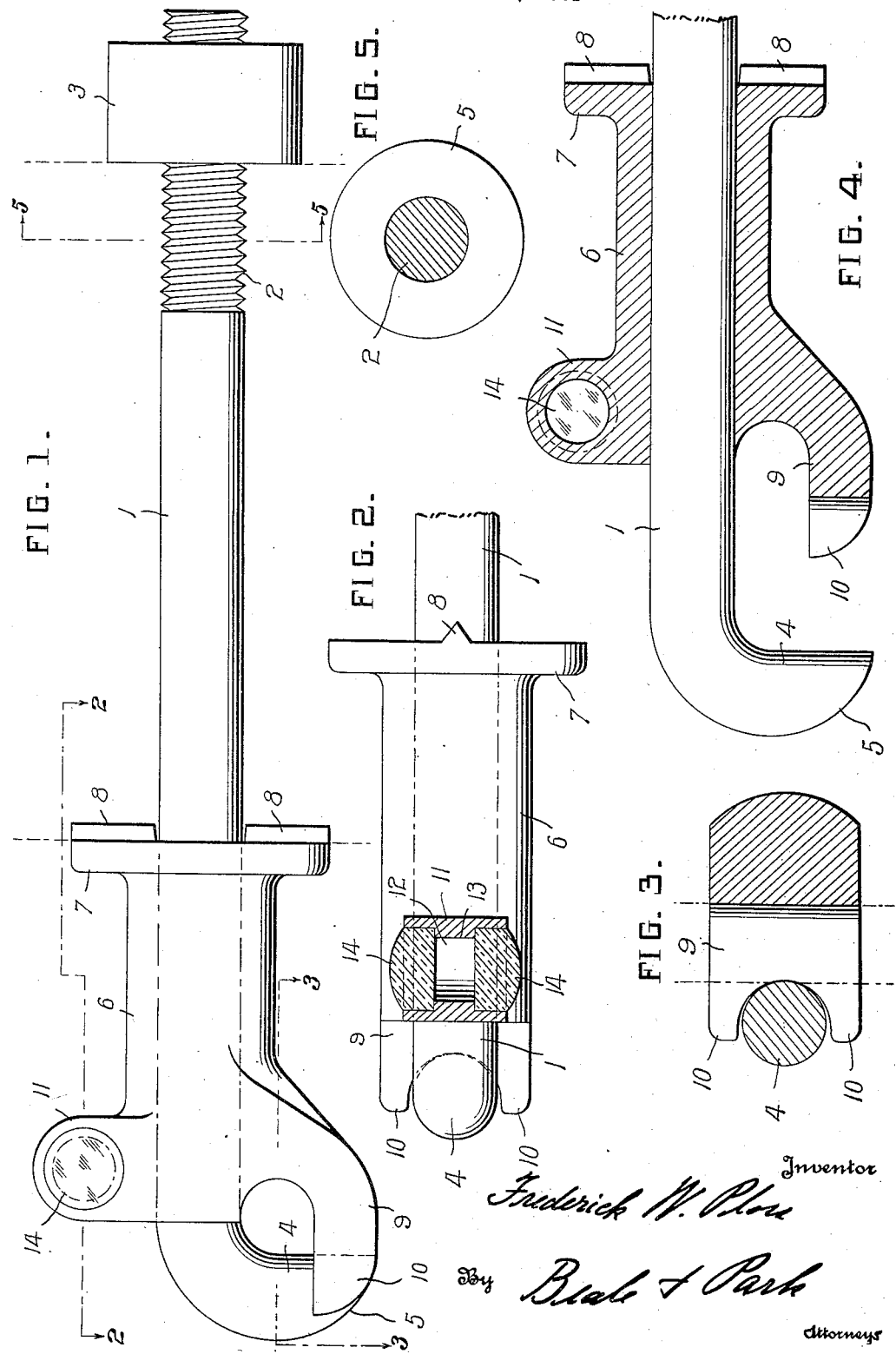

1,867,469

UNITED STATES PATENT OFFICE

FREDERICK W. PLOSS, OF PHILADELPHIA, PENNSYLVANIA

HANGER

Application filed November 25, 1931. Serial No. 577,362.

My invention consists in a new and useful improvement in hangers, and is designed more particularly to provide a means for supporting cables upon posts to provide guard rails along highways, bridges, etc. The particularly novel feature of my device is the provision of only two parts to form co-acting claws to clamp the cable therebetween. My device is thus simple in construction and cheaply manufactured, yet it is very efficient, since the co-acting claws are readily adjustable, the cable easily inserted between the claws, and the whole device easily and effectively mounted upon the posts supporting the cable. With my improved device for supporting the cable I have combined a reflector mounting so that the guard rail is provided with a reflecting warning signal.

While I have illustrated in the drawing filed herewith and have hereinafter fully described one specific embodiment of my invention, it is to be distinctly understood that I do not consider my invention limited to said specific embodiment, but refer for its scope to the claims appended hereto.

In the drawing:—

Fig. 1 is a side elevation of my device.

Fig. 2 is a plan view, partly in section, of a portion of my device, on the line 2—2 of Fig. 1.

Fig. 3 is a horizontal section on the line 3—3 of Fig. 1.

Fig. 4 is a vertical section of a portion of my device, showing the bolt and collar in a different position from that shown in Fig. 1.

Fig. 5 is a section on the line 5—5 of Fig. 1.

The embodiment of my invention illustrated in the drawing has the bolt 1 provided at one end with the threaded portion 2 on which is the round nut 3, and at the other end with the claw 4 disposed at right angles to the bolt 1 and having its lower outer edge formed as a rounded face 5. Received about the bolt 1, there is the sleeve 6 having at one end the peripheral flange 7 provided on its outer face with the radial teeth 8. This sleeve 6 is provided at its other end upon one side with a claw 9 having the jaws 10, and on its other side with the bracket 11 with the bore 12 therethrough in which is the abutment 13. Reflectors 14 are received in the bore 12 and seated against the abutment 13.

From the foregoing description of the details of construction of my device, its use will be obvious. The bolt 1 is inserted through the proper bolt hole of the post upon which the cable is to be carried. The sleeve 6, being moved along the bolt 1 so as to permit the cable to be inserted between the claw 4 of the bolt 1 and the claw 9 of the sleeve 6, is then moved so that the end of the claw 4 is received between the jaws 10 of the claw 9, the cable being thus confined between the claws 4 and 9. The nut 3 is then turned up on the threaded portion 2 of the bolt 1, causing the teeth 8 of the flange 7 to bite into the post on which my device is mounted, to prevent rotation of the bolt 1, until the flange 7 abuts the exterior of the post, when the claw 4 is drawn securely between the jaws 10 against the claw 9 of the sleeve 6, and thus the jaws 4 and 9 are tightly engaged to hold the cable in place.

The bracket 11 provides a suitable mounting for the reflectors 14, and it is to be noted that as the reflectors 14 completely close the bore 12 of the bracket 11, neither reflector 14 may be tampered with or removed.

Having described my invention, what I claim is:

1. In a hanger, the combination of a bolt having a threaded portion and nut thereon; a sleeve slidably mounted on said bolt; a bracket on said sleeve having a transverse bore; reflectors mounted in said bore: a second bracket on said sleeve provided with jaws; and a claw on said bolt so disposed as to be received between said jaws.

2. In a hanger, the combination of a bolt; a sleeve on said bolt; a bracket on said sleeve having a transverse bore; reflectors mounted in said bore; and a second bracket on said sleeve provided with a claw.

3. In a hanger, the combination of a bolt; a sleeve having a transverse bore and a claw; and reflectors mounted in said bore.

4. In a hanger, the combination of a bolt; a sleeve thereon provided with means adapted to clamp a filament upon the bolt; a housing on said sleeve; and a reflector mounted in said housing.

5. In a hanger, the combination of a bolt; a sleeve thereon provided with means adapted to clamp a filament upon the bolt; an enlargement upon said sleeve having a transverse bore; a peripheral abutment disposed intermediate of said bore providing two seats; and a reflector disposed on each seat.

In testimony whereof I affix my signature.

FREDERICK W. PLOSS.